INVENTOR.
Samuel M. Waas
BY
ATTORNEY.

United States Patent Office 2,777,599
    Patented Jan. 15, 1957

2,777,599

AUTOMATIC LID CONTROL FOR POPCORN KETTLES

Samuel M. Waas, Kansas City, Mo., assignor to Manley, Inc., Kansas City, Mo., a corporation of Missouri Application December 8, 1954, Serial No. 473,974

6 Claims. (Cl. 220—47)

This invention relates to improvements in popcorn machines and particularly in novel structure for automatically raising the lid of a popcorn kettle to a position spaced above the open top of the kettle upon initial movement of the lid by the popped corn in the kettle.

It is the most important object of the instant invention to provide lid-control structure for popcorn machines operable to automatically raise the lid while confining its travel along a rectilinear, vertical line in total absence of arcuate swinging about a pivot as has heretofore been the practice.

Another important object of the instant invention is to provide lid structure for popcorn kettles having spring-loaded linkage operably connected with the lid in supporting relationship thereto for yieldably holding the lid either in a fully closed or fully open position until such time as the popcorn rises in the kettle to initially unseat the lid therefrom.

Other objects include important details of construction all of which will be made clear or become apparent as the following specification progresses, reference being had to the accompanying drawing, wherein.

The desirability of providing means for automatically raising lids of popcorn kettles has heretofore been explained in the prior art and various mechanisms have been suggested for accomplishing the desired result. So far as I am aware however, such prior constructions have operated generally on a swinging principle wherein the lid must travel through an arc, or where rectilinear travel has been suggested, the control mechanism has incorporated expensive and complicated features such as rotation of the lid on a screw or the like to cause the same to rise as the lid rotates on the screw.

As will hereinafter appear, it is unnecessary for the popped corn to rotate the lid in order for the automatic mechanism to take over and continue the upward movement of the lid away from the kettle.

Figure 3:
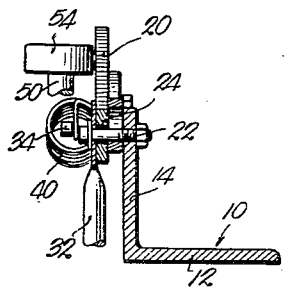
Fig. 3 is an enlarged, cross-sectional view taken on line III—III of Fig. 2.

To this end there is provided an elongated bar 10 that is L-shaped in cross-section as shown in Fig. 3 presenting therefore, a horizontal leg 12 and an upright leg 14, the former of which may rest directly upon a ceiling or other support 16 forming a part of the popcorn machine with which the improvements hereof are adapted to be used. A series of bolts or other fasteners 18 extend through leg 12 for rigid attachment of the bar 10 to the support 16.

A swingable element in the nature of an elongated arm 20 is pivotally connected to the leg 14 at one end thereof through use of a pivot pin 22 which extends through a short longitudinal slot 24 in the arm 20 so that the latter may reciprocate on its longitudinal axis, as well as swing on the horziontal axis of pivot pin 22.

The arm 20 is additionally connected to the leg 14 of bar 10 at the opposite end thereof through the medium of a short link 26. Pivot pin 28 swingably couples the link 26 to the leg 14 and pivot means 30 swingably joins the link 26 to the arm 20 intermediate the ends of the latter.

A handle in the nature of an elongated rod 32 is connected to the arm 20 between slot 24 and pivot means 30 through use of a pivot pin 34. Rod or handle 32 depends from the arm 20 and extends through an opening 36 in the ceiling 16. A hand knob 38 is attached to the lowermost end of the rod 32.

Powers means in the nature of a spring 40 is connected at one end thereof to any rigid member such as the pivot pin 28 and at the opposite end to the arm 20, and to this end, the pivot pin 34 may be extended as shown in Fig. 3 for receiving the spring 40.

Popcorn kettle 42 is mounted in any suitable manner within the popcorn machine beneath the ceiling 16 and may be provided with a bottom (not shown) swingable to and from a position dumping the popped corn from the kettle 42. Kettle 42 is additionally provided with a lid 44 normally closing the open top of the kettle 42 during the popping operation. Lid 44 is guided in its vertically reciprocable, rectilinear movement by a pipe or the like 46 secured to the ceiling 16 in depending relationship thereto. Lid 44 is perforated to clear the guide 46 and has a collar or slide 48 that rides along the guide 46.

Lid 44 is operably coupled with the arm 20 through use of an upstanding member or rod 50 joined directly to the lid 44 at its lowermost end alongside the guide 46 and in parallelism thereto. An opening 52 in the ceiling 16 slidably receives the rod 50 and a head 54 on the upper end of the rod 50 receives a stud or the like 56 for pivotally connecting the upper end of rod 50 with that end of arm 20 opposite to slot 24.

Figure 1:
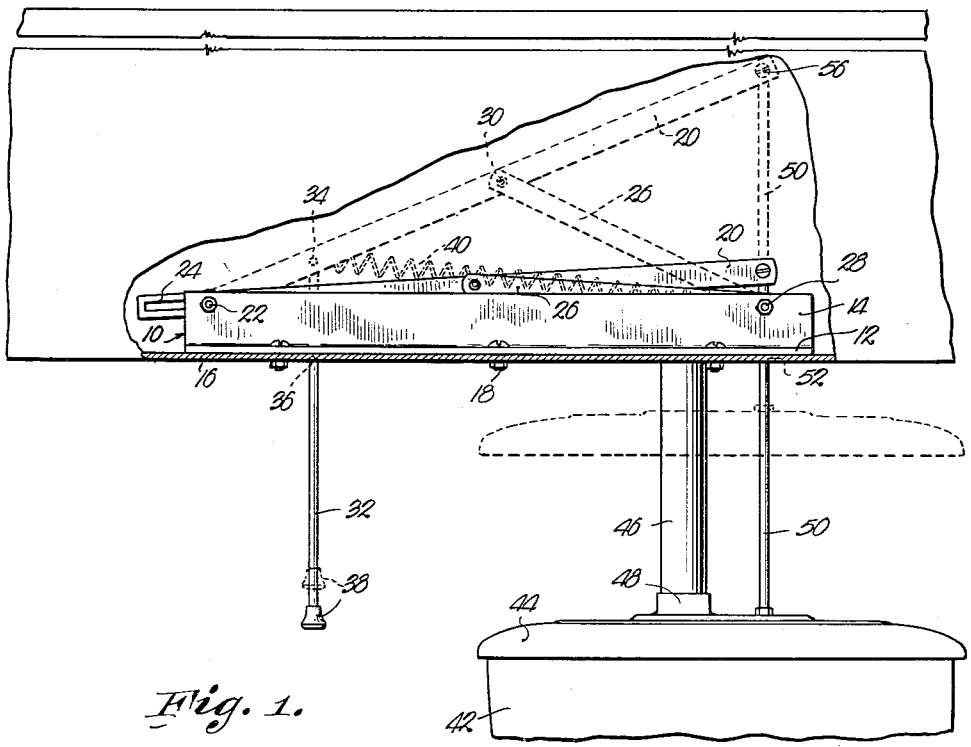
Figure 1 is a fragmentary, side elevational view of a popcorn machine embodying an automatic lid control for popcorn kettles made pursuant to my present invention, parts being broken away to reveal details of construction.
Figure 2:
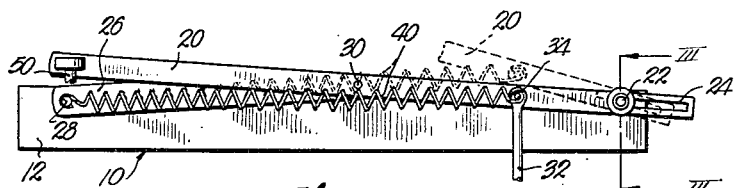
Fig. 2 is a rear elevational view showing the linkage forming a part of the control entirely removed from association with the lid, kettle and remaining parts of the machine.

The spring 40 is so disposed as to yieldably hold the lid 44 in the normal position shown by full lines in Fig. 1, resting or seated upon the kettle 42 in closing relationship to the open top thereof. Lid 44 may be moved to such operable position by grasping the knob 38 and pulling downwardly on the handle 32.

The kettle 42 is charged with raw popcorn, seasoning such as cottonseed oil or the like, and with salt, when the lid 44 is in the raised position shown by dotted lines in Fig. 1 After the bulk of popped corn in the kettle 42 rises to a position contacting the lid 44, such popped corn will cause the lid 44 to rise slightly in unseated relationship to the kettle 42, permitting such popped corn to spill out of the kettle 42, through its open top and over the sides thereof.

Spring 40 is so disposed as to automatically lift lid 44 to the dotted-line position shown in Fig. 1 as soon as the popped corn has caused the lid 44 to rise a predetermined distance on the guide 46. As the arm 20 swings on the pivot 22 it is also permitted to slide therealong because of the provision of slot 24. Thus, spring 40 yieldably holds the lid 44 at each end of its path of travel and by virtue of the construction shown in the drawing and hereinabove described, the lid 44 does travel through a true rectilinear path and without rotation.

Having thus described the invention what is claimed as new and desired to be secured by Letters Patent is:

1. In a popcorn machine, a support; an elongated element; pivot means at one end of said element mounting the same on the support for swinging movement on a horizontal axis; means slidably securing the element to said pivot means; a member pivotally connected to the element at the opposite end of the latter and depending therefrom for vertical reciprocation as the element is swung; a kettle having a lid connected to the member at the lowermost end of the latter; and spring means coupled with said element for sliding the same in one direction on said pivot means to swing said member upwardly and lift the lid rectilinearly after the lid is initially elevated from the kettle by popped corn in the latter.

2. In a popcorn machine as set forth in claim 1 wherein the number is guided by the support and wherein is provided a link pivotally interconnecting the element and the support intermediate the end of the element for forcing the element to slide on the pivot means and prevent binding of said member in the support.

3. In a popcorn machine as set forth in claim 1 wherein is provided a handle pivotally connected to the element and depending therefrom.

4. In a popcorn machine as set forth in claim 1 wherein is provided a vertical guide depending from the support, the lid being vertically slidable on the guide.

5. In a popcorn machine, a support; an elongated element; pivot means at one end of said element mounting the same on the support for swinging movement on a horizontal axis; means slidably securing the element to said pivot means; a member pivotally connected to the element at the opposite end of the latter and depending therefrom for vertical reciprocation as the element is swung; a kettle having a lid connected to the member at the lowermost end of the latter; and a spring interconnecting said support and said element intermediate the ends of the latter for sliding the same in one direction on said pivot means to swing said member upwardly and lift the lid rectilinearly after the lid is initially elevated from the kettle by popped corn in the latter.

6. In a popcorn machine as set forth in claim 5 wherein said spring is disposed in substantial alignment with the elongated element when the latter is at the lowermost end of its path of travel to yieldably hold the lid on the kettle when the member is at the lowermost end of its path of travel.

References Cited in the file of this patent
UNITED STATES PATENTS

| | | |
|---|---|---|
| 1,422,064 | Kane | July 4, 1922 |
| 1,515,989 | Banes | Nov. 18, 1924 |
| 2,263,944 | Cline | Nov. 25, 1941 |
| 2,483,304 | Vogel | Sept. 27, 1949 |